United States Patent [19]

Sheets

[11] Patent Number: 4,670,837
[45] Date of Patent: Jun. 2, 1987

[54] ELECTRICAL SYSTEM HAVING VARIABLE-FREQUENCY CLOCK

[75] Inventor: Laurence L. Sheets, St. Charles, Ill.

[73] Assignees: American Telephone and Telegraph Company; AT&T Bell Laboratories, both of Murray Hill, N.J.

[21] Appl. No.: 624,469

[22] Filed: Jun. 25, 1984

[51] Int. Cl.⁴ ............................................. H03K 5/04
[52] U.S. Cl. ................................. 364/200; 328/38.1
[58] Field of Search ................ 364/200, 900; 328/62, 328/38; 365/222

[56] References Cited

U.S. PATENT DOCUMENTS

| | | | |
|---|---|---|---|
| 3,453,601 | 7/1969 | Bogert et al. | 364/200 |
| 3,656,123 | 4/1972 | Carnevale et al. | 340/172.5 |
| 3,775,696 | 11/1973 | Garth | 331/57 |
| 3,922,526 | 11/1975 | Cochran | 235/152 |
| 4,037,090 | 7/1977 | Raymond, Jr. | 364/200 |
| 4,191,998 | 3/1980 | Carmody | 364/200 |
| 4,241,418 | 12/1980 | Stanley | 364/900 |
| 4,331,924 | 5/1982 | Elliot et al. | 328/38 |
| 4,414,637 | 11/1983 | Stanley | 364/569 |
| 4,438,490 | 3/1984 | Wilder, Jr. | 364/200 |
| 4,447,870 | 5/1984 | Tague et al. | 364/200 |
| 4,463,440 | 7/1984 | Nishiura et al. | 364/900 |

FOREIGN PATENT DOCUMENTS 0098653 6/1983 European Pat. Off. .
2248170 4/1974 Fed. Rep. of Germany .

Primary Examiner—Gareth D. Shaw
Assistant Examiner—Randy W. Lacasse
Attorney, Agent, or Firm—Ross T. Watland

[57] ABSTRACT

The microprocessor unit of a system implemented using metal-oxide-silicon (MOS) technology, is driven by a variable-frequency clock. The microprocessor controls the clock frequency based on the present rate of required microprocessor activity. By driving the microprocessor unit at a lower clock frequency when such activity rate is low, the energy dissipated by the microprocessor unit is reduced due to the MOS power-frequency characteristic.

7 Claims, 6 Drawing Figures

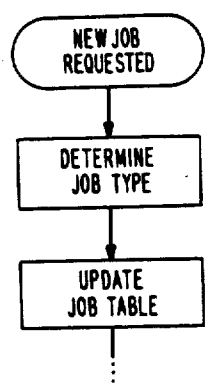
FIG. 2
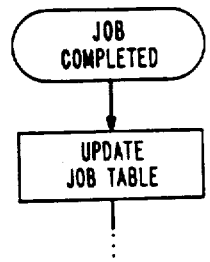
FIG. 3
FIG. 4
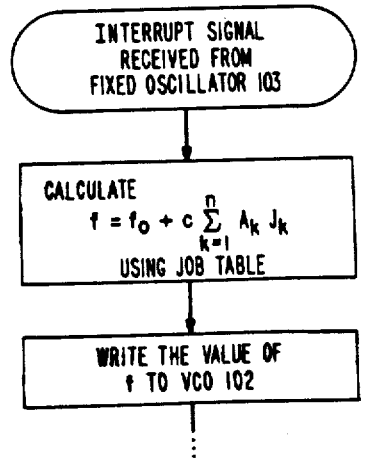
FIG. 5

ELECTRICAL SYSTEM HAVING VARIABLE-FREQUENCY CLOCK

TECHNICAL FIELD

This invention relates to clocked, electrical systems, and, more particularly, to microprocessor-based systems implemented using metal-oxide-silicon (MOS) technology.

BACKGROUND OF THE INVENTION

One very important aspect of the continuing evolution of silicon technology is the proliferation of microprocessors throughout our society. Because of the significant reductions in their size and cost, such processors can be economically used in many applications where the use of computers could not otherwise be justified. Even in applications where larger computers, e.g., minicomputers, have traditionally been used, the advantages of distributed processing have been obtained by using a number of microprocessors to perform the functions previously performed by a single larger processor. For example, many of the control functions previously performed by the central control unit in stored program controlled switching systems are being performed in more modern systems by a number of microprocessors which are distributed toward the system periphery and which communicate with each other to control system operation.

One countervailing factor to weigh against the established advantages of distributed processing is the large amount of power typically required to keep such distributed control processors continuously energized. This factor will become even more important as the cost of energy continues to increase. The power dissipation of microprocessors also becomes important when they are used in portable, battery-powered personal computers. In these applications and others, the ma9nitude of power required to operate microprocessor-based systems is a problem which diminishes the otherwise overall attractiveness of such systems.

SUMMARY OF THE INVENTION

The aforementioned problem is advantageously solved and a technical advance is achieved in accordance with the principles of the invention in both an electrical system driven by a variable-frequency clock and an associated system operation method which reduce the magnitude of energy required by the electrical system by determining the processing load presented to the system and then reducing the clock frequency at which the system is driven, during times when the processing load is reduced. The amount of the saving is dependent on the power-frequency characteristic associated with the particular technology with which the electrical system is implemented.

BRIEF DESCRIPTION OF THE DRAWING

A more complete understanding of the present invention may be obtained from a consideration of the following description when read in conjunction with the drawing in which:

FIGS. 2 through 5 are diagrams illustrating a method of monitoring the processing load and computing the required clock frequency to reduce the magnitude of energy required by the system of FIG. 1.

DETAILED DESCRIPTION

Figure 1:
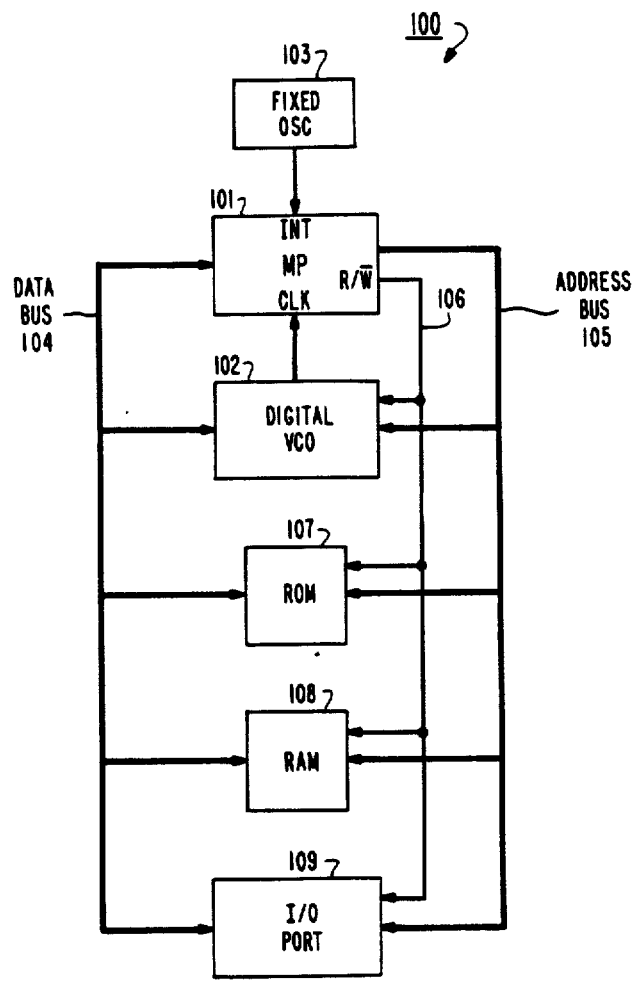
FIG. 1 is a block diagram of a microprocessor-based system illustrating the principles of the present invention.

FIG. 1 is a block diagram of an exemplary microprocessor-based system 100 illustrating the principles of the present invention. The system is controlled by a microprocessor 101 which communicates with associated devices via a data bus 104 and an address bus 105. For example, microprocessor 101 reads information from a read only memory (ROM) 107 via data bus 104 by transmitting a logic one signal from a control terminal R/$\overline{\text{W}}$ via a conductor 106 and transmitting on address bus 105, an address defining both ROM 107 and the particular location of ROM 107 to be read. ROM 107 is typically used to store information such as programs to be executed by microprocessor 101 or fixed data. Microprocessor 101 reads information in like manner from a random access memory (RAM) 108, used to store variable data, or from an input/output (I/O) port 109, used to interface with various external devices (not shown), e.g., devices being operated under the control of microprocessor 101. In addition, microprocessor 101 also writes information via data bus 104 to RAM 108 or I/O port 109 by transmitting a logic zero signal from control terminal R/$\overline{\text{W}}$ on conductor 106 and transmitting the appropriate address on address bus 105.

The portion of system 100 described thus far is well known. Various other control or status signals are typically conveyed between microprocessor 101 and its associated devices to achieve correct system operation. However, since such signals are not relevant to the present invention and tend to vary depending upon the particular family of devices used in a given implementation, they are not further described herein. Microprocessor 101 and its associated devices are energized by means of a DC power source (not shown), e.g., a battery or, alternatively, a DC power supply driven from a commercial AC source. The present invention is directed to reducing the amount of energy drawn by system 100 from such a DC source. In addition to energy savings, an enhancement of long-term system reliability is also obtained.

Microprocessor-based systems such as system 100 are typically implemented using metal-oxide-silicon (MOS) technology. The magnitude of power consumed by a MOS device at a given voltage is substantially directly proportional to the frequency at which the device is operated. In the case of microprocessor 101, which is a relatively complex MOS device, the duration of each execution cycle is defined by the signal received at a CLK terminal. In accordance with the present exemplary embodiment of the invention, a digital, voltage-controlled oscillator (VCO) 102 transmits the cycle-defining clock signal. Upon determining the amount of processing required at any given time, microprocessor 101 computes an operating frequency that is sufficient to meet the offered processing load. Microprocessor 101, which communicates with VCO 102 via data bus 104, address bus 105 and conductor 106 in the same manner as with RAM 108 or I/O port 109, writes a digital word defined by the computed frequency via data bus 104 to VCO 102. VCO 102 gradually adjusts the frequency of the clock signal transmitted to microprocessor 101 to the computed frequency in response to the digital word. Reducing the clock frequency reduces the power consumed by microprocessor 101 and, by reducing the required access rate to the associated devices, i.e., ROM 107, RAM 108, and I/O port 109, also reduces the power consumed by those devices. The power reduction is substantially directly proportional to the reduction of the clock frequency. For example, a frequency reduction from 20 megahertz to 10 megahertz will result in a saving of approximately 50%.

In system 100, the timing of real-time events is controlled by microprocessor 101 in response to interrupt signals received at an INT terminal from a fixed-frequency oscillator 103. For example, microprocessor 101 repeats the process of computing the required frequency based on the processing load and writing a digital word to digital VCO 102 at regular intervals as defined by the interrupt signals from fixed oscillator 103.

In the present embodiment, microprocessor 101 determines its processing load to control the VCO 102 clock frequency at any given time by using a linear regression. All possible processing jobs expected for microprocessor 101 in a particular application, are categorized according to complexity, i.e., the number of execution cycles required for completion, into n job types, where n is a positive integer greater than one. Associated with each job type is a predetermined weighting factor $A_k$ which defines the complexity of that job type with respect to other job types. Microprocessor 101 maintains a job table (FIG. 2) in RAM 108. The job table lists for each job type the number, $J_k$, of jobs of that type presently required. As shown in FIG. 3, when each processing job is requested, the associated job type is determined and the job table is updated by incrementing $J_k$ by one. Jobs may be requested in a number of ways. For example, certain jobs may be required at regular intervals as defined by the interrupt signals from fixed oscillator 103. Other jobs may be requested in response to information received from external devices and read via I/O port 109. After each processing job is completed, the job table is updated by decrementing $J_k$ by one for the associated job type (FIG. 4). Thus the job table in RAM 108 is kept current at all times. As shown in FIG. 5, each time that microprocessor 101 receives an interrupt signal from fixed oscillator 103, microprocessor 101 reads each of the $J_k$ values in the job table and computes the required clock frequency, f, according to $$f = f_0 + c \sum_{k=1}^{n} A_k J_k,$$

where $f_o$ is the lowest desired frequency and c is an appropriate scale factor. (Alternatively, the $A_k$ weighting factors could be properly scaled to eliminate the need for the scale factor c.) A digital word defined by the computed value of f is then written to VCO 102.

Figure 6:
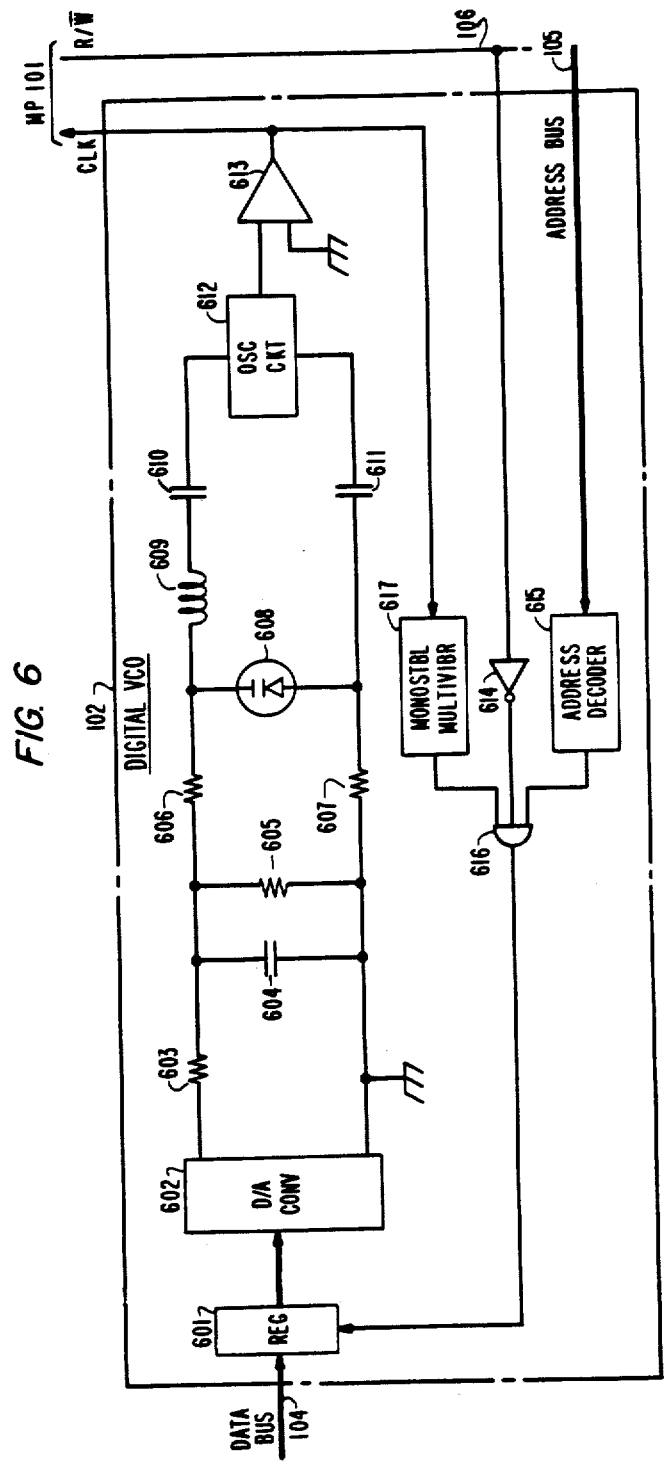
FIG. 6 is a circuit diagram of a digital, voltage-controlled oscillator included in the system of FIG. 1.

In the present embodiment, di9ital VCO 102 is implemented as an LC oscillator (FIG. 6). When microprocessor 101 computes a new clock frequency, it transmits a digital word defined by that frequency via data bus 104 to a register 601. Microprocessor 101 also transmits an address on address bus 105 to an address decoder 615. Address decoder 615 responds to the particular address defining VCO 102 by transmitting a logic one signal to an AND gate 616. Microprocessor 101 transmits a logic zero signal on conductor 106 from its R/W terminal to an inverter 614, which in turn transmits a logic one signal to AND gate 616. When a monostable multivibrator 617 transmits a logic one signal to a third input terminal of AND gate 616, AND gate 616 responds by transmitting a logic one signal to register 601 which then stores the digital word from data bus 104. A D/A converter 602 generates an analog control voltage in response to the digital word in register 601. The analog control voltage is filtered by a low-pass filter comprised of resistors 603 and 605 and a capacitor 604, the values of which determine a filter time constant such that the control voltage transmitted varies slowly with respect to the minimum required clock frequency. The resistor 605 is connected across capacitor 604 as a discharging means. The control voltage is then applied via a pair of decoupling resistors 606 and 607 to a varicap diode 608, having a capacitance that varies from 25 to 100 picofarads with applied voltage. The combination of the variable capacitance of the varicap diode 608 and the inductance of an inductor 609, e.g., 2.5 microhenries, is coupled via a pair of coupling capacitors 610 and 611 to an oscillator circuit 612. Oscillator circuit 612, which is implemented in the present embodiment as an amplifier circuit, transmits a sinusoidal signal at the frequency determined by the combination of varicap diode 608 and inductor 609. The sinusoidal signal transmitted by circuit 612 is applied to one input terminal of comparator 613, which has its other input terminal 9rounded. Accordingly, comparator 613 transmits a square wave at the determined frequency. The square wave is transmitted to both the CLK terminal of microprocessor 101 to define its execution cycle and to monostable multivibrator 617 which responds by transmitting a logic one signal to AND gate 616 as described above. Monostable multivibrator 617 transmits a pulse of predetermined duration on the leading edge of the square wave generated by comparator 613 and is included to assure that each data word on data bus 104 is stable before AND gate transmits a logic one signal to store that data word in register 601.

In this embodiment, the relationship between the clock frequency computed by microprocessor 101 and the digital word transmitted to VCO 102 is predetermined based on the characteristic of VCO 102. Accordingly, when microprocessor 101 computes a given clock frequency, it transmits a digital word to VCO 102 according to the predetermined relationship such that VCO 102 generates the given clock frequency in response to that digital word.

It is to be understood that the above-described embodiment is merely illustrative of the principles of the present invention and that other embodiments may be devised by those skilled in the art without departing from the spirit and scope of the invention. For example, the LC oscillator implementation of digital VCO 102 may be replaced by a switched RC oscillator where resistors of differing resistance are switched in and out of the circuit to vary the frequency in response to the digital words received by the D/A converter. Rather than computing the frequency based on the processing backlog, the activity on data bus 104 and address bus 105 could be monitored and then used as a basis for determining the required frequency. Instead of using a continuously variable-frequency clock, selections can be made from a small number of discrete frequencies. For example, in a battery-powered personal computer with an operating system which includes a sleep state, the microprocessor CPU could be operated at a low frequency sufficient to keep any dynamic logic refreshed, e.g., 500 kilohertz, when the operating system is in the sleep state, and the frequency could then be increased to a nominal operating frequency, e.g., 10 megahertz, when wakeup occurs. In some applications, the desired clock frequency could be determined based on historical activity records rather than in real time. For example, the operating frequency of the distributed microprocessors used for control in a telephone switching system could be adjusted based on calling patterns observed during different times of the day or during different days of the week as a way of reducing the energy requirements of the system. It is to be recognized that any of a number of microprocessor families can be advantageously used in such systems. One specific example is the Motorola 68000 microprocessor and its associated devices. Furthermore, the invention is applicable to clocked, electrical systems other than microprocessor-based systems where power consumption is a function of clock frequency as, for example, in gate arrays.

What is claimed is:

1. In an electrical system driven by a variable-frequency clock to perform processing jobs, a method of operating said system under control of a processor to increase efficiency in power consumption comprising:

determining the processing load of said system based on all requested but uncompleted processing jobs and adjusting the frequency of said clock basewd on the determined processing load, where each of said processing jobs is one of n types, n being a positive integer greater than one, said method further comprising maintaining data that define a number, $J_K$, of jobs of type K for each integer K from one through n, to be performed by said system, wherein said determining step further comprises reading said data and wherein said adjusting step further comprises adjusting the frequency, f, of said clock according to $$f = f_0 + C \sum_{K=1} A_K J_K,$$

wehrein f0 is a minimum frequency, $A_K$ is a weighting factor associated with jobs of type K, and C is a predetermined scale factor.

2. A method in accordance with claim 1 further comprising repeating at regular intevals said determining step and said adjusting step.

3. A method in accordance with claim 1 wherein said maintianing step further comprises incrementing said number, $J_k$, by one as each job of type k is requested and decremeting said number, $J_k$, by one as each job of type k is completed.

4. An electrical system comprising:

variable-frequency clock means for transmitting a clock signal of variable frequency, electrical means for performing processing jobs at an operating frequency defined by the frequency of said clock signal, said electrical means comprising a processor means for repetitively determining the processing load of said electrical means based on all requested but uncompleted processing jobs and means coupled to said variable-frequency clock means for adjusting the frequency of said clock signal basedon the processing load determined by said determining means, wherein each of said processing jobs is one of n types, n being a positive integer greater than one, said system further comprises means for maintaining data that define a number, $J_K$, of jobs of type K, for each integer K from one through n, to be performed by said system, wherein said determining means further comprises means for reading said data wherein said adjusting means further comprises means for calculating an operating frequency, f, according to $$f = f_0 + C \sum_{K=1} A_K J_K,$$

wherein $f_0$ is a minimum frequency, $A_K$ is a weighting factor associated with jobs of type K, and C is a predetermined scale factor and means for transmitting a digital word defined by said calculated operating frequency, f, to said variable-frequency clock means, wherein said variable-frequency clock means is responsive to said digital word for generating said clock signal at said calculating operating frequency, f.

5. An electrical system in accordance with claim 4 wherein said variable-frequency clock means further comprises converter means for generating an analog control voltage in response to said digital word and oscillator means coupled to said converter means for generating said clock signal at a frequncy defined by said analog control voltage.

6. An electrical system in accordance with claim 5 further comprising low-pass filter means interposed between said converter means and said oscillato means for filtering said analog control voltage.

7. An electrical system in accordance with claim 4 wherein said electrical means is implemented in metal-oxide-silicon technology.

* * * * *

UNITED STATES PATENT AND TRADEMARK OFFICE
CERTIFICATE OF CORRECTION

PATENT NO. : 4,670,837
DATED : June 2, 1987
INVENTOR(S) : Laurence L. Sheets

It is certified that error appears in the above-identified patent and that said Letters Patent is hereby corrected as shown below:

IN THE CLAIMS

Column 5, line 30, "basewd" should be "based",
Column 5, line 47, "wehrein" should be "where",
Column 5, line 52, "intevals" should be "intervals",
Column 5, line 56, "maintianing" should be "maintaining";
Column 6, line 1, "decremeting" should be "decrementing",
Column 6, line 15, "basedon" should be "based on",
Column 6, line 48, "frequncy" should be "frequency",
Column 6, line 53, "oscillato" should be "oscillator".

Signed and Sealed this

Seventeenth Day of July, 1990

Attest:

HARRY F. MANBECK, JR.

*Attesting Officer*   *Commissioner of Patents and Trademarks*